United States Patent [19]

Holden et al.

[11] Patent Number: 4,904,731

[45] Date of Patent: Feb. 27, 1990

[54] POLYMERIC COMPOSITION

[75] Inventors: Geoffrey Holden; David R. Hansen, both of Houston, Tex.

[73] Assignee: Shell Oil Company, Houston, Tex.

[21] Appl. No.: 293,535

[22] Filed: Dec. 30, 1988

Related U.S. Application Data

[63] Continuation of Ser. No. 94,955, Sep. 4, 1987, abandoned.

[51] Int. Cl.$^4$ .................... C08L 53/00; C08L 23/16; C08L 23/18
[52] U.S. Cl. ........................................ 525/98; 525/89
[58] Field of Search .......................................... 525/98

[56] References Cited

U.S. PATENT DOCUMENTS

| | | | |
|---|---|---|---|
| 3,231,635 | 1/1966 | Holden et al. | 260/880 |
| 3,265,765 | 8/1966 | Holden et al. | 260/876 |
| 3,299,174 | 1/1967 | Kuhre et al. | 260/876 |
| 3,322,856 | 5/1967 | Holden et al. | 260/876 |
| 3,700,633 | 10/1972 | Wald | 260/880 B |
| 4,178,328 | 12/1979 | Thiruvillakkat | 525/98 |
| 4,391,949 | 8/1987 | St. Clair | 525/99 |
| 4,426,495 | 1/1984 | Vitus et al. | 525/92 |
| 4,430,476 | 2/1984 | Liu | 525/67 |
| 4,434,264 | 2/1984 | Ficker | 524/323 |
| 4,444,953 | 4/1984 | St. Clair | 525/98 |
| 4,476,274 | 10/1984 | Liu | 524/445 |
| 4,495,323 | 1/1985 | Collins | 524/426 |
| 4,499,238 | 2/1985 | Iwata et al. | 525/98 |
| 4,560,727 | 12/1985 | Crossan | 525/95 |
| 4,588,777 | 5/1986 | Hotta | 525/93 |
| 4,634,735 | 1/1987 | Thiersault et al. | 525/240 |

OTHER PUBLICATIONS

Plastics World-Linear LDPE-pp. 45 & 46-2/81.

*Primary Examiner*—Carman J. Seccuro
*Attorney, Agent, or Firm*—Del S. Christensen

[57] ABSTRACT

A polymeric composition comprising: an olefin polymer; a hydrogenated block copolymer comprising at least two polymeric block containing predominantly monoalkenyl aromatic hydrocarbon monomer units and at least one block containing predominantly hydrogenated, conjugated diolefin monomeric monomer units; and an LLDPE. The weight ratio of block copolymer to LLDPE in the polymeric composition will be within the range from about 5:1 to about 1:3. Shaped structures prepared with the polymeric composition will generally exhibit good clarity and good impact strength.

10 Claims, No Drawings

POLYMERIC COMPOSITION

This is a continuation of application Ser. No. 094,955, filed Sept. 4, 1987, now abandoned.

BACKGROUND OF THE INVENTION

1. Field of the Invention

This invention relates to a polymeric composition. More particularly, this invention relates to a polymeric composition comprising an olefin polymer.

2. Prior Art

Olefin polymers and compositions comprising such polymers are, of course, well known in the prior art. Both the polymers and various compositions comprising such polymers are frequently used in molding applications to prepare molded articles as well as in the preparation of films, sheets, textile coatings and the like. Use of the various olefin polymers in many of these applications is, however, frequently restricted due to the poor impact resistance of the products thus produced. Use of the olefin polymers in many of these applications is also limited due to poor tensile strength, poor clarity in the various products produced and whitening or "blushing" of certain such products when subjected to stress or impact.

Heretofore, several methods have been proposed for use in an effort to avoid one or more of these problems. For example, it has heretofore been proposed to incorporate a selectively hydrogenated triblock copolymer, having terminal polymeric blocks of a vinyl aromatic monomer and a central polymeric block prepared originally with a conjugated diolefin and subsequently hydrogenated, into a polymeric composition comprising one or more olefin polymers primarily for the purpose of improving impact resistance and to reduce whitening or "blushing" such as taught in U.S. Pat. No. 3,299,174. The improved impact resistance is, however, apparently, achieved at the expense of losing other properties such as stiffness, particularly when polypropylene is the olefin polymer used. It has, therefore, been proposed to incorporate crystalline polyethylene into a polymeric composition comprising propylene and a hydrogenated block copolymer so as to achieve a better balance between stiffness and impact resistance as is taught in U.S. Pat. No. 4,178,328. It is also known in the prior art to incorporate a relatively high polymerized styrene content linear or radial block copolymer comprising styrene polymeric blocks and butadiene polymeric blocks into a composition comprising crystalline polypropylene to produce resin products having a pearl-like pattern or luster and excellent impact strength and hinging properties as taught in U.S. Pat. No. 4,499,238. It is further known in the prior art to add a copolymer of ethylene and vinyl acetate to a polymeric composition comprising a hydrogenated block copolymer of an aromatic vinyl compound and a conjugated diene and polypropylene to produce products having improved softness, transparency, high temperature strength and molding characteristics as taught in U.S. Pat. No.4,588,777.

As is well known in the prior art, incorporation of a hydrogenated linear or radial block copolymer comprising two or more blocks containing predominantly aromatic hydrocarbon monomers and at least one polymeric block containing predominantly conjugated diolefin monomers into a polymeric composition comprising one or more olefin polymers will, indeed, solve several of the problems which have hampered the various products produced from olefin polymers. Polymeric compositions comprising an olefin polymer and a linear or radial block copolymer comprising at least two polymeric blocks containing predominantly monoalkenyl aromatic hydrocarbon monomer units and at least one polymeric block containing predominantly conjugated diolefin monomer units have not, however, been widely accepted commercially, apparently due to the relatively high cost of the block copolymer component. The need, then, for a polymeric composition comprising one or more olefin polymers, the products from which will be free from one or more of the aforementioned deficiencies, which polymeric composition can be produced at a lower cost is believed to be readily apparent.

SUMMARY OF THE INVENTION

It has now been discovered that a polymeric composition comprising one or more olefin polymers, the products from which will exhibit good properties, can be produced at a lower cost than when a block copolymer comprising at least two polymer blocks of a monoalkenyl aromatic hydrocarbon and at least one polymer block prepared with a conjugated diolefin monomer, and subsequently hydrogenated, is used as the sole modifier in said composition. It is, therefore, an object of this invention to provide a polymeric composition comprising an olefin polymer. It is another object of this invention to provide such a composition which can be molded into shaped articles having good impact resistance. It is still another object of this invention to provide such a polymeric composition which can be used to produce shaped articles having good tensile strength. It is yet another object of this invention to produce such a polymeric composition which can be used to manufacture shaped articles having a reduced tendency to whiten or "blush". It is still a further object of this invention to provide such a polymeric composition which can be produced at a lower cost than similar compositions which may be used to produce shaped articles having the same or nearly the same properties. It is an even further object of this invention to provide such a polymeric composition which can be used to produce shaped articles, generally, having good clarity. The foregoing and still other objects and advantages of the present invention will become apparent from the description set forth hereinafter and the examples included therein.

In accordance with the present invention, the foregoing and other objects and advantages are accomplished with a polymeric composition comprising: an olefin polymer; a hydrogenated block copolymer comprising at least two polymeric blocks containing predominantly polymerized monoalkenyl aromatic hydrocarbon monomer units and at least one polymeric block containing predominantly polymerized conjugated diolefin monomer units which are subsequently hydrogenated; and a linear low density polyethylene (LLDPE). As used herein in connection with block copolymer composition, the recitation "predominantly" is intended to mean that the recited monomer unit constitutes at least 85 wt. % of the polymer block. The remaining monomer units may be any monomer copolymerizable with the specified monomer including the monomer or monomers contained in other polymeric blocks of the block copolymer. The olefin polymer will be the predominant polymeric component in the polymeric composition while the block copolymer and the LLDPE will be combined and used as a modifier at modifier concentrations.

DETAILED DESCRIPTION OF THE INVENTION

As indicated supra, the present invention is drawn to a polymeric composition comprising: an olefin polymer; a hydrogenated block copolymer comprising at least two polymeric blocks containing predominantly polymerized monoalkenyl aromatic hydrocarbon monomer units and at least one polymeric block containing predominantly polymerized conjugated diolefin monomer units which are subsequently hydrogenated; and an LLDPE. In general, shaped articles produced from the polymeric composition of this invention will exhibit good impact resistance, good tensile strength, good clarity and a reduced whitening or "blushing" tendency and will, generally, also exhibit good oxidation and thermal stability. As is well known in the prior art, "blushing" is the tendency of a shaped article to whiten in a stressed area when the article is subjected to stress, particularly impact or flexing stresses.

In general, any of the olefin polymers known in the prior art to be useful in the preparation of shaped articles can be used in the polymeric composition of this invention. Suitable olefin polymers, then, include homopolymers of alpha olefins having from 2 to about 10 carbon atoms per molecule, copolymers of such alpha-olefins and copolymers of such alphaolefins and one or more other monomers copolymerizable therewith. Other monomers copolymerizable with such alphaolefins include, but are not necessarily limited to, vinyl esters such as vinyl acetate, acrylic and methacrylic acid esters such as methylacrylate and methylmethacrylate, ethylenically unsaturated carboxylic acids such as acrylic and methacrylic acids, and the like. As is well known in the prior art, olefin polymers, particularly polymers of olefins containing 3 or more carbon atoms per molecule may exhibit atactic, syndiotactic and/or isotactic structures. In general, polymers containing any combination of these structures are useful in the polymeric composition of the present invention. The invention is, however, most effective when the olefin polymer exhibits a crystallinity of at least 35%. Olefin copolymers exhibiting this degree of crystallinity are, of course, well known in the prior art and such copolymers will exhibit significantly improved properties when used in the polymeric composition of this invention. The results realized with the modifier useful in the composition of this invention are even further improved when the olefin polymer comprises at least about 40% crystalline structure and such olefin polymers are, therefore, most preferred for use in the polymeric composition of this invention. Polymers of this type may be prepared with the methods summarized in U.S. Pat. No. 3,299,174, the disclosure of which patent is herein incorporated by reference.

In general, any of the selectively hydrogenated block copolymers comprising at least two polymeric blocks containing predominantly polymerized monoalkenyl aromatic hydrocarbon monomer units and at least one polymeric block containing predominantly polymerized conjugated diolefin monomer units, which are hydrogenated after incorporation into the polymer, known in the prior art may be used as a component in the polymer composition of this invention. Suitable hydrogenated block copolymers may be prepared by hydrogenating a block copolymer prepared in accordance with techniques well known in the prior art such as those described in U.S. Pat. Nos. 3,231,635; 3,265,765; 3,322,856; 4,426,495 and 4,444,953, the disclosure of which patents are incorporated herein by reference. In general, block copolymers which may be hydrogenated to form the hydrogenated block copolymers useful in the polymeric composition of this invention will have one of the following general formulae: $B_x$-$(A-B)_y$-$A_z$ and $[B_{x'}$-$(A-B)_{y'}$-$A_{z'}]_n$-$Z$ wherein A and B are as defined in the aforementioned U.S. Pat. Nos. 3,231,635; 2,265,765; 3,322,856; 4,391,949 and 4,444,953; x and z are, independently, integers equal to 0 or 1; y is a whole number from 1 to about 25; provided, however, that $z + y \geq 2$; x' and z' are independently, integers ranging from 0 to 1; y' is a whole number from 1 to 25; n is a whole number from 2 to 30, and Z is coupling agent nucleus of a star-shaped or linear block copolymer. In general, each polymeric block A may have the same or a different weight average molecular weight within the range from about 4,000 to about 50,000 and each polymeric block B may have the same or a different weight average molecular weight within the range from about 10,000 to about 200,000. In a preferred embodiment, each polymeric block A will have approximately the same weight average molecular weight within the range from about 5,000 to about 10,000 and each polymeric block B will have approximately the same weight average molecular weight within the range from about 25,000 to about 100,000.

In general, the block copolymers useful in the present invention may be hydrogenated using any of the methods known in the prior art to suitable for such hydrogenation. In general, the conditions used to hydrogenate the block copolymers useful in this invention will be selected to insure that at least 50%, preferably at least 80% and most preferably at least 95% of the ethylenic unsaturation remaining in the conjugated diolefin polymer blocks after preparation is saturated as a result of the hydrogenation. The hydrogenation conditions will also be selected so as to insure that less than 20%, preferably less than 10% and most preferably less than 5% of the aromatic unsaturation in the monoalkenyl aromatic hydrocarbon polymer blocks is hydrogenated.

In general, suitable hydrogenation methods involve the use of a suitable catalyst comprising a Group VI or Group VIII metal atom. Suitable catalysts are described in U.K. Patent Specification No. 1,030,306, the disclosure of which Patent Specification is herein incorporated by reference, and in U.S. Pat. No. 3,700,633, the disclosure of which U.S. Patent is herein incorporated by reference. A particularly preferred method for selectively hydrogenating the block copolymers useful in this invention is the process described in the aforementioned U.S. Pat. No. 3,700,633. In this process, selective hydrogenation is accomplished in the same solvent as is used to effect polymerization with a catalyst prepared by reacting an aluminum alkyl with a nickel or cobalt carboxylate or alkoxide. In general, hydrogenation is accomplished at a temperature within the range of from about 25° C. to about 175° C. at a hydrogen partial pressure below 5,000 psig and usually within the range from about 250 psig to about 1,500 psig. In general, the use of lower temperatures and lower hydrogen partial pressures will reduce the amount of aromatic unsaturation that is hydrogenated.

In general, any of the linear low density polyethylenes (LLDPE) known in the prior art to be useful as a modifer in a polymeric composition may be used as a modifier in the polymeric composition of this invention. Such LLDPE's are taught, for example, in U.S. Pat. Nos. 4,430,476; 4,476,274; 4,495,323 and 4,560,727, the disclosure of which patents are hereby incorporated by reference. Interestingly, it is within the scope of the teaching of each of these patents to use the LLDPE in combination with a copolymer comprising polymerized monoalkenyl aromatic hydrocarbon monomer units and polymerized conjugated diolefin monomer units. Moreover, the use of block copolymers comprising at least one polymeric block containing predominantly polymerized monoalkenyl aromatic hydrocarbon monomer units and at least one polymeric block containing predominantly polymerized conjugated diolefin monomeric units is specifically taught in three of these patents; viz., U.S. Pat. Nos. 4,430,476; 4,495,323 and 4,560,727. The conjugated diolefin polymer block may be hydrogenated in the composition taught in U.S. Pat. No. 4,430,476 and is hydrogenated in the composition taught in U.S. Pat. No. 4,560,727. In general, the linear low density polyethylenes useful in the polymeric composition of the present invention will have melt indexes between about 0.1 and about 50 as determined by ASTM D1238 (conditions FR-190/2.16) and a density within the range from about 0.90 to about 0.94 g/cc. The best balance as between impact resistance and clarity is, however, generally realized with LLDPE's having densities of less than about 0.92. LLDPE's having densities within this range are, therefore, preferred. Moreover, the compositions are most readily prepared with LLDPE's having melt indexes above about 10 g/10 min. LLDPE's having melt indexes above about 10g/10 min, as determined by ASTM D1238 (conditions FR-190/2.16) are, therefore, preferred. The LLDPE's useful in the polymeric composition of this invention will, generally, have crystalline melting points above about 100° C. As is well known, LLDPE is, actually, a random copolymer of ethylene and a minor amount, generally less than 20 mole %, preferably less than 15 mol % of an alphaolefin having 3 to 15 carbon atoms, preferably 3 to 10 carbon atoms and most preferably 4 to 8 carbon atoms. The LLDPE's useful in the present invention may be prepared using any of the processes well known in the prior art such as those described in the book "Polyethylene" by Raff and Allison, Interscience Publishers (1956) and in Kirk-Othmer Encyclopedia of Science and Technology, Volume 14, pages 242-282 (2nd ed., 1967).

In general, the hydrogenated block copolymer and LLDPE will each be added to the polymeric composition at a concentration within the range from about 2 to about 15 parts, by weight, per 100 parts, by weight olefin polymer in the composition. Moreover, the weight ratio of hydrogenated block copolymer to LLDPE will be within the range from about 5:1 to about 1:3 and preferably will be within the range from about 1:1.5 to about 1.5:1. Most preferably, the weight ratio of hydrogenated block copolymer to LLDPE will be 1:1.

In general, any of the techniques known in the prior art for blending polymeric components may be used to combine the polymeric components of the polymeric composition of this invention. Suitable blending techniques, then, include solution blending, solid state physical admixture, molten state admixture, extrusion admixture, roll milling and the like. Of these, solution blending will, generally, produce the most uniform blend, however, mixing in the molten state with equipment such as a Banbury mixers, extruders or roll mills will be more convenient. In general, molten phase admixture will be accomplished at temperatures within the range from about 140° C. to about 270° C. but higher and lower temperatures may, in some cases at least, be operable.

The polymer compositions of this invention may be used in any of the applications for which olefin polymers are known to be useful. Such uses include the production of molded objects, mechanical goods and extruded materials. The polymeric compositions of this invention may be used in injection molding operations, blow molding operations, compression molding operations and the like. The polymeric compositions of this invention may also be extruded or coextruded to produce films, sheets, textile coatings, pipes, wire coatings, fibers and the like.

Depending upon the particular application or end use in which the polymeric composition of this invention is to be used, the same may be compounded with other components known in the art including synthetic and natural reinforcing fillers such as carbon black, asbestos, fibers and the like; pigments such at titanium dioxide, iron blue, cadmium pigments, chrome yellow, molybdate orange, ultramarine blue, molybdate red, zinc chromate, ultramarine green, various acid dyes, basic dyes, anthraquinones, Red Lake C, Red 23, benzidine yellow, benzidine orange, carbon blacks and the like; various plasticizers; antiblocking agents; antioxidants; lubricants; flame retardants and the like. In general, these materials, when used, will be used at effective concentrations well known in the prior art. Moreover, these materials may be added to the polymeric composition using techniques well known in the prior art.

PREFERRED EMBODIMENT OF THE INVENTION

In a preferred embodiment of the present invention, a crystalline copolymer containing from about 97 to about 94 wt. % polymerized propylene and from about 6 to about 3 wt. % polymerized ethylene having a flow rate as determined using ASTM D1238 (conditions FR-230/2.16) within the range from about 0.5 to about 50 g/10 min. will be modified by combining it with from about 2.5 to about 10 parts, by weight, per 100 parts, by weight, of said copolymer of propylene and ethylene, of a hydrogenated block copolymer comprising 2 polystyrene blocks, each styrene block having a weight average molecular weight within the range from about 5,000 to about 10,000 and one polybutadiene block, which polybutadiene block will be hydrogenated after preparation, each polybutadiene block having a weight average molecular weight within the range from about 25,000 to about 100,000 and with from about 2.5 to about 10 parts, by weight, per 100 parts, by weight of said copolymer of propylene and ethylene, of an LLDPE having a melt index as determined by ASTM D1238 (conditions FR-190/2.16) greater than 10g/10 min. and a density less than about 0.92 g/cc. In the preferred embodiment, the copolymer of propylene and ethylene will be at least 40% crystalline. In a preferred embodiment, preparation of the conjugated diolefin block will be controlled such that from about 30 to about 55 mol % of the conjugated diolefin monomer polymerizes via 1,2-addition and from about 45 to about 70 mole % of the conjugated diolefin polymerizes via 1,4-addition. In the preferred embodiment, the hydrogenation of the block copolymer will be accomplished such that at least about 80% and most preferably at least about 95% of the initial ethylenic unsaturation in the butadiene polymeric block is hydrogenated and such that less than about 5% of the aromatic unsaturation in the styrene polymeric blocks is hydrogenated. In the preferred embodiment, the weight ratio of hydrogenated block copolymer to LLDPE will be within the range from about 1:1.5 to about 1.5:1 and in a most preferred embodiment, the weight ratio of hydrogenated block copolymer to LLDPE will be about 1:1. In the preferred embodiment, the polymeric components will be combined in the molten state using suitable mixing equipment such as a Banbury mixer or a twin screw extruder at a temperature within the range from about 175° C. to about 250° C.

Having thus broadly described the present invention in a preferred and most preferred embodiment thereof, it is believed that the invention will become even more apparent by reference to the following examples. It will be appreciated, however, that the examples are presented solely for purposes of illustration and should not be construed as limiting the invention.

EXAMPLE 1

In this Example, five polymer compositions, three of which were within the scope of this invention, were prepared with three different propylene polymers and then shaped into disks 2½ in. in diameter and ⅛ in. thick using injection molding. Each of the polymeric compositions was prepared by blending the polymeric components in a twin screw extruder. The first three of these polymeric compositions contained 15 wt. % of a modifier comprising equal weights of (1) a hydrogenated block copolymer comprising 2 blocks of polystyrene and a single block of hydrogenated polybutadiene and (2) an LLDPE having a density of about 0.918 g/cc. Each of the polystyrene blocks of the block copolymer had a weight average molecular weight of about 10,000 while the hydrogenated polybutadiene block had a weight average molecular weight of about 47,000. The LLDPE had a melt index, as previously defined of about 1 g/10 min. The first of these three polymer compositions, which is hereinafter referred to as composition 1, was prepared with a propylene homopolymer having a flow rate as previously defined of about 5 g/10 min.; the second of these compositions, hereinafter referred to as Composition 2, was prepared with a sequential impact copolymer comprising 91.5 wt. % polymerized propylene and 8.5 wt. % polymerized ethylene having a flow rate of about 5 g/10 min.; and the third of these compositions, hereinafter referred to as Composition 3, was prepared with a random copolymer comprising 96% polymerized propylene and 4 wt. % polymerized ethylene having a flow rate of about 4 g/10 min. The fourth of the five compositions, which is hereinafter referred to as Composition 4, was prepared with a propylene copolymer identical to that used in Composition 3 and contained 15 wt. % of a commercially available impact modifier which was a copolymer comprising about 50 wt. % of high density polyethylene and about 50 wt. % of EPDM. The fifth of the five compositions, which is hereinafter referred to as Composition 5, was prepared with a propylene copolymer identical to that used in Composition 3 and contained 15 wt. % of a block copolymer identical to that used in Compositions 1-3. After preparation, the disks were then visually evaluated for clarity and tested for impact resistance using the Gardner Impact Test Procedure (without ring) at −10° C. The disks were also visually evaluated for blushing after impact. The results obtained with each of the five compositions are summarized in the following Table;

TABLE

| Composition | Clarity | Impact Strength, in lbs. | Blushing After Impact |
|---|---|---|---|
| 1 | Clear | 48 | Moderate |
| 2 | Cloudy | >400 | Very severe |
| 3 | Clear | 228 | Very slight |
| 4 | Cloudy | 133 | Severe |
| 5 | Clear | 156 | Very slight |

As will be apparent from the data summarized in the preceding Table, the impact resistance of the disk prepared with Composition 3, which contained the mixed modifier of this invention, was superior to that of the disks prepared with Compositions 4 and 5, which contained prior art impact modifiers, while the other tested properties, clarity and blush resistance were at least as good. As also will be apparent from the data summarized in the preceding Table, the effectiveness of the mixed modifier used in the composition of this invention varies with the particular olefin polymer used in the composition. For example, when the composition was prepared with a sequential impact copolymer, Composition 2, excellent impact resistance was realized but both clarity and blush resistance were generally lacking. The use of pigments could, however, offset the clarity deficiency thereby permitting use of this composition to manufacture shaped articles having good impact strength. The impact resistance of the disk prepared with composition 1 is, of course, low but the value actually realized is a significant improvement over the impact resistance exhibited by the polypropylene homopolymer alone. The balance of impact resistance and clarity appears, from the data summarized in the preceding Table, to be best when the olefin (polypropylene) polymer is a random copolymer containing a relatively minor amount (<10 wt. %) of a polymerized comonomer, in this case ethylene.

EXAMPLE 2

In this Example, six polymeric compositions, three of which compositions are within the scope of this invention were prepared. All six polymeric compositions were prepared with a propylene random copolymer containing about 96 wt. % polymerized propylene and 4 wt. % polymerized ethylene having a flow rate as previously defined of about 10 g/10 min. The three compositions within the scope of this invention contained 12.5 wt. % of combined hydrogenated block copolymer and LLDPE. The hydrogenated block copolymer actually used in these compositions had two polystyrene blocks, each with a molecular weight of about 7,200 and a single hydrogenated polybutadiene block having a molecular weight of about 34,000. Before hydrogenation, the polybutadiene had about 38% 1,2-enchainment and about 62% 1,4-enchainment. The LLDPE had a density of about 0.917 and a melt index, as previously defined, of about 25 g/10 min. The first of these compositions, hereinafter referred to as Composition 6, contained the hydrogenated block copolymer and LLDPE in a weight ratio of 3:1 (the composition contained 9.4 wt. % of hydrogenated block copolymer and 3.1 wt. % LLDPE). The second of these compositions, hereinafter referred to as Composition 7, contained the hydrogenated block copolymer and LLDPE in a weight ratio of 1:1 (the composition contained 6.25 wt. % of each). The third of these compositions, hereinafter referred to as Composition 8, contained the hydrogenated block copolymer in a weight ratio of 1:3 (the composition contained 3.1 wt. % hydrogenated block copolymer and 9.4 wt. % LLDPE). The fourth of the six compositions, hereinafter referred to as Composition 9, contained 87.5 wt. % of the propylene copolymer and 12.5 wt. % of a hydrogenated block copolymer identical to that used in Compositions 6–8. The fifth of the six compositions, hereinafter referred to as Composition 10, contained 87.5 wt. % of the propylene copolymer and 12.5 wt. % of an LLDPE identical to that used in Compositions 6–8. The sixth of the six compositions, hereinafter referred to as Composition 11, was simply the propylene copolymer without an impact modifier of any kind. After preparation of the polymeric compositions, at least a portion of each was shaped into at least one plaque having a thickness of 0.06 in. and the plaques then tested for haze using ASTM procedure D-1003 and the Gardner Impact Strength was determined using the procedure summarized in Example 1. The results actually obtained with each composition are summarized in the following Table:

TABLE

| Composition | Haze | Impact Strength, in. lbs. |
|---|---|---|
| 6 | 34 | 230 |
| 7 | 35 | 360 |
| 8 | 46 | 120 |
| 9 | 47 | 350 |
| 10 | 61 | 15 |
| 11 | 35 | 7 |

As will be apparent from the data summarized in the preceding Table, polymeric compositions comprising an olefin polymer, particularly a propylene polymer, produced shaped articles having good impact strengths when the polymeric composition also contained a hydrogenated block copolymer and LLDPE in a weight ratio within the range from 3:1 to 1:3 (Compositions 6–8) when compared to shaped articles prepared with the same olefin polymer from a composition containing only LLDPE as a modifier (Composition 10) or without a modifier (Composition 11). In fact, the composition containing a 50-50 blend of the hydrogenated block copolymer and LLDPE (Composition 7) resulted in an impact strength at least as good as that for a composition containing what was, heretofore, believed to be the best modifier (Composition 9) with better haze values. The raw materials cost for the blend is, of course, substantially lower than the cost of an equal amount of the hydrogenated block copolymer.

EXAMPLE 3

In this Example, eight polymeric compositions, all within the scope of this invention, were prepared. All eight were prepared with a propylene random copolymer identical to that used in the polymeric compositions prepared in Example 2. The first seven of these eight polymeric compositions were prepared with a selectively hydrogenated styrene-butadiene-styrene block copolymer identical to that used in Compositions 6–8 of Example 2. Each of these seven compositions was prepared with a different LLDPE. These seven compositions are hereinafter identified as Compositions 12–18. The eighth of these compositions was prepared with a selectively hydrogenated styrene-butadiene-styrene block copolymer identical to that used in Compositions 1–3 of Example 1. The eighth of these compositions was also prepared with a LLDPE identical to that used in Composition 18. The eight of these compositions is hereinafter referred to as Composition 19. Each of the eight compositions contained 85 wt. % of the random copolymer, 7.5 wt. % of the block copolymer and 7.5 wt. % LLDPE. After preparation, at least a portion of each composition was shaped into at least one disk 2½ in. in diameter and ⅛ in. thick using injection molding techniques. After preparation, the disks were visually observed for clarity and ranked on a four point scale wherein 1 was assigned to those disks having the best clarity. The Gardner impact strength was also determined for each disk using the procedure summarized in Example 1. The results obtained with each composition as well as the density and melt index of the LLDPE used in composition are summarized in the following Table:

TABLE

| Composition No. | LLDPE density, g/cc | LLDPE MI, g/10 min | Clarity | Impact Strength, in lbs |
|---|---|---|---|---|
| 12 | 0.918 | 3.2 | 1.5 | >400 |
| 13 | 0.926 | 12. | 3 | >400 |
| 14 | 0.926 | 50. | 3 | >400 |
| 15 | 0.934 | 5.8 | 4 | >400 |
| 16 | 0.918 | 1.0 | 1.5 | >400 |
| 17 | 0.924 | 20. | 3 | >400 |
| 18 | 0.917 | 25. | 1 | >400 |
| 19 | 0.917 | 25. | 2 | >400 |

As will be apparent from the data summarized in the preceding Table, all of the modifiers tested significantly improved the impact strength of the shaped products. Best clarity, however, was obtained when the composition contained an LLDPE having a density less than about 0.920 (cf. Compositions 12, 16, 18 and 19) and also when the LLDPE had a high melt index (cf. Composition 18). The somewhat poorer clarity obtained with composition 19 is attributed to the higher molecular weight of the block copolymer used, and particularly the molecular weight of the polystyrene blocks.

While the present invention has been described and illustrated by reference to particular embodiments thereof, it will be appreciated those of ordinary skill in the art that the same may lend itself to variations not necessarily described or illustrated herein. For this reason, then, reference should be made solely to the appended claims for purposes of determining the true scope of the present invention.

Having thus described and illustrated the present invention, what is claimed is:

1. A polymeric composition comprising: 100 parts by weight of a random copolymer of ethylene and propylene, the copolymer containing from about 97 to 94%w polymerized propylene and from about 6 to 3%w polymerized ethylene; from about 2.5 to about 10 parts by weight, of a selectively hydrogenated block copolymer comprising at least two polymeric blocks containing predominantly polymerized monoalkenyl aromatic hydrocarbon monomer units and at least one polymeric block containing predominantly polymerized, hydrogenated diolefin monomer units; and LLDPE wherein the LLDPE is a copolymer of ethylene and less than about 20% by weight of an alpha-olefin having 3 to 10 carbon atoms, the weight ratio of hydrogenated block copolymer to LLDPE being within the range from about 5:1 to about 1:3.

2. The polymeric composition of claim 1 wherein the weight ratio of block copolymer to LLDPE is within the range from about 1:1.5 to about 1.5:1.

3. The polymeric composition of claim 1 wherein said polymeric block containing predominantly monoalkenyl hydrocarbon monomer units has a weight average molecular weight within the range from about 5,000 to about 10,000 and said polymeric block containing predominantly hydrogenated diolefin monomeric units has a weight average molecular weight within the range from about 25,000 to about 100,000.

4. The polymeric composition of claim 3 wherein said LLDPE has a melt index above about 10 g/10 min. and a density less than about 0.92.

5. The polymeric composition of claim 4 wherein said monoalkenyl aromatic hydrocarbon monomer unit is a styrene monomer unit and said conjugated diolefin monomer unit is a butadiene monomer unit.

6. The polymeric composition of claim 5 wherein said random copolymer a flow rate within the range from about 0.5 to about 50 g/10 min.

7. The polymeric composition of claim 6 wherein said random copolymer is at least 40% crystalline.

8. The polymeric composition of claim 1 wherein said selectively hydrogenated block copolymer and said LLDPE are each present at a concentration within the range from about 2 to 15 parts, by weight, per 100 parts, by weight, based on said random copolymer of ethylene and propylene.

9. The polymeric composition of claim 4 wherein said hydrogenated block copolymer and said LLDPE are each present at a concentration within the range from about 2.5 to about 10 parts, by weight, per 100 parts, by weight, of said copolymer of propylene and ethylene.

10. The polymeric composition of claim 9 wherein the weight ratio of selectively hydrogenated block copolymer to LLDPE is about 1:1.

* * * * *